United States Patent
Dishman et al.

(10) Patent No.: US 8,200,990 B2
(45) Date of Patent: Jun. 12, 2012

(54) APPARATUS, SYSTEM, AND METHOD FOR A HIGH EFFICIENCY REDUNDANT POWER ARCHITECTURE

(75) Inventors: Cecil C. Dishman, Raleigh, NC (US); Jen-Ching Lin, Apex, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 11/963,792

(22) Filed: Dec. 22, 2007

(65) Prior Publication Data

US 2009/0164806 A1    Jun. 25, 2009

(51) Int. Cl.
G06F 1/26    (2006.01)
(52) U.S. Cl. .............. 713/300; 714/14; 714/22
(58) Field of Classification Search .......... 713/300, 713/310, 340; 714/14, 22
See application file for complete search history.

(56) References Cited

U.S. PATENT DOCUMENTS

| | | | | |
|---|---|---|---|---|
| 5,977,656 A * | 11/1999 | John | | 307/43 |
| 6,121,693 A * | 9/2000 | Rock | | 307/18 |
| 7,012,815 B2 | 3/2006 | Garnett et al. | | 361/825 |
| 7,124,321 B2 | 10/2006 | Garnett et al. | | 714/14 |
| 7,191,347 B2 | 3/2007 | Bigelow et al. | | 713/300 |
| 7,194,643 B2 | 3/2007 | Gonzalez et al. | | 713/320 |
| 7,421,596 B2 * | 9/2008 | Fukumori | | 713/300 |
| 2003/0112582 A1 * | 6/2003 | Sanders et al. | | 361/600 |
| 2005/0235865 A1 * | 10/2005 | Kumar | | 105/61 |
| 2006/0063400 A1 | 3/2006 | Tsai | | 430/74 |
| 2006/0238218 A1 * | 10/2006 | Ritchie et al. | | 326/30 |
| 2006/0290205 A1 * | 12/2006 | Heber et al. | | 307/65 |
| 2008/0030077 A1 * | 2/2008 | Tiry et al. | | 307/43 |

OTHER PUBLICATIONS

Ranganathan et al., "Ensemble-level Power Management for Dense Blade Servers", Proceedings of the 33$^{rd}$ International Symposium on Computer Architecture (ISCA '06), IEEE 2006.
Heath et al."Energy Conservation in Heterogeneous Server Clusters", PPoPP '05, Jun. 15-17, 2005.
Wang et al., "Orion: A Power-Performance Simulator for Interconnection Networks", IEEE 2002.
Felter, On the Performance and Use of Dense Servers, IBM Journal of Research and Development, 2003, vol. 47, Issue 5-6.

\* cited by examiner

*Primary Examiner* — Paul Yanchus, III
(74) *Attorney, Agent, or Firm* — Kunzler Needham Massey & Thorpe

(57) ABSTRACT

An apparatus, system, and method are disclosed for providing regulated electric power. At least two power buses transfer regulated direct current ("DC") power from at least four power supplies to an electric load. The power supplies receive electric power from one or more electric sources and convert the electric power to the regulated DC electric power. A switch is connected between each of the power buses and the electric load. Each switch connects and disconnects a power bus to the electric load and transfers the regulated DC electric power from the buses to the electric load. An output power bus connection is disposed on each of the power supplies. Each of the power buses is connected to at least two power supplies and each output power bus connection connects the corresponding power supply upon which the output power bus connection is disposed to exactly one power bus.

20 Claims, 5 Drawing Sheets

APPARATUS, SYSTEM, AND METHOD FOR A HIGH EFFICIENCY REDUNDANT POWER ARCHITECTURE

BACKGROUND OF THE INVENTION

1. Field of the Invention

This invention relates to electric power supplies and more particularly relates to high efficiency redundant electric power supplies.

2. Description of the Related Art

A power supply, sometimes known as a power supply unit or PSU, is a device or system that supplies electric power to an output load or group of loads. A power supply may be configured to convert power from one form to another form, such as converting AC electric power to regulated DC electric power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

For example, in an electric device such as a computer, the power supply is typically designed to convert an AC voltage input such as is traditionally provided by a conventional wall socket, into several low-voltage DC power outputs for transmission to the internal electric components of the computer. Conversion is typically performed in stages that may include different stages such as a rectification stage, an active filter stage, a regulator stage, etc. The various stages may be a boost, a buck, or other derivative topology. In one embodiment of a conventional power supply, a regulator stage may be implemented to provide a number of different voltages to a computer system via a bus. For example, the power supply may include a regulator stage that regulates voltages on the bus of +12 volts, +5 volts, +3.3 volts, and −12 volts. These regulated voltages are then provided to the computer system which uses the different voltages to power the various electrical sub-systems of the computer system.

For high availability systems, it is often desirable that a single failure will not cause the system to be unavailable. One solution is to provide redundant power by using two or more separate power supplies. This solution has an advantage of being very reliable, since if any one power supply fails, the other can pick up the load of the failed power supply. Two or more power buses are often used as an additional layer of redundancy in case of a power bus fault. Each power bus is usually connected to each of the power supplies using ORing metal-oxide-semiconductor field-effect transistors ("MOSFETs"). The ORing MOSFETs can isolate power supplies and power buses from the electric load in fault situations, allowing continued availability of the system.

Because an ORing MOSFET is often used at each power bus connection at both the inputs and outputs of the power buses, the number of MOSFETs used in the system increases the cost of the system, and reduces the system's energy efficiency. For example, some MOSFETs cost about $4 each. A system with four power supplies and two power buses may have ten MOSFETs, adding about $40 to the cost of the system. A power supply system that eliminates the use of some of the ORing MOSFETs without reducing redundancy or fault protection would decrease the cost of the system significantly and increase energy efficiency by several percent.

FIG. 1 is an example of a traditional system 100 for providing reliable power. The system 100 includes two AC power sources 102, 104, four power supplies 110, 112, 114, 116, two buses 118, 120, and a load 122. Each power supply 110, 112, 114, 116 is connected to each of the two buses using switches Q1-Q8. Each bus 118, 120 connects to the load 122 through a switch Q9, Q10. The system 100 is very flexible, but also requires a lot of switches and connections which brings raises the cost of the system.

SUMMARY OF THE INVENTION

From the foregoing discussion, it should be apparent that a need exists for an apparatus, system, and method that can provide redundant power supplies and buses at a lower cost than traditional redundant power supplies and buses. Beneficially, such an apparatus, system, and method would provide protection in the event of a power supply fault or a power bus fault while using less ORing switches than traditional redundant power supplies ad buses.

The present invention has been developed in response to the present state of the art, and in particular, in response to the problems and needs in the art that have not yet been fully solved by currently available power supply systems. Accordingly, the present invention has been developed to provide an apparatus, system, and method for providing electric power that overcome many or all of the above-discussed shortcomings in the art.

The apparatus to provide reliable electric power is provided with a plurality of components configured to functionally execute the necessary steps of providing reliable electric power. The apparatus in the described embodiments include at least two power buses that transfer regulated direct current ("DC") power from at least four power supplies to an electric load. The at least four power supplies receive electric power from one or more electric sources and convert the electric power to the regulated DC electric power. The apparatus includes a switch connected between each of the at least two power buses and the electric load. Each switch connects and disconnects a power bus to the electric load and transfers the regulated DC electric power from the buses to the electric load.

The apparatus includes an output power bus connection disposed on each of the at least four power supplies. Each of the power buses is connected to at least two power supplies and each output power bus connection connects the corresponding power supply upon which the output power bus connection is disposed to exactly one power bus. The output power bus connections transfer the regulated DC electric power to the connected power bus.

In one embodiment, the power supplies receive the electric power from two electric sources. In another embodiment, about half of the at least four power supplies receive electric power from a first electric source and the remainder of the at least four power supplies receive electric power from a second AC electric source. In a further embodiment, the power buses comprise two power buses, where each of the two power buses is electrically coupled to two output power bus connections.

In one embodiment, the at least two switches are each configured to disconnect a power bus from the electric load in response to a power bus fault. In another embodiment, the at least two switches comprise mechanical switches. In another embodiment, the at least two switches are semiconductor devices. In a further embodiment, the at least two switches comprise field-effect transistors ("FETs"). In another embodiment, the at least two switches are metal-oxide-semiconductor field-effect transistors ("MOSFETs"). In yet another embodiment, the at least two switches are bipolar junction transistors ("BJTs"). In another embodiment, the electric load includes the at least two switches. In another embodiment, the regulated DC electric power has a voltage of about 12 volts.

Each of the power supplies, in one embodiment, includes an isolation module. Each of the isolation modules isolates a power supply from a power bus in response to a power supply fault.

A system of the present invention is also presented to provide reliable electric power. The system may be embodied by at least four power supplies that receive electric power from one or more electric sources and that convert the electric power to a regulated direct current ("DC") electric power. The system includes one or more electric devices comprising an electric load. The system includes at least two power buses that transfer the regulated DC power from the at least four power supplies to the load of the one or more electric devices.

The system includes a switch connected between each of the at least two power buses and the electric load. Each switch connects and disconnects a power bus to the electric load and transfers the regulated DC electric power from the buses to the electric load. The system includes an output power bus connection disposed on each of the at least four power supplies. Each of the power buses is connected to at least two power supplies and each output power bus connection connects the corresponding power supply upon which the output power bus connection is disposed to exactly one power bus. The output power bus connections transfer the regulated DC electric power to the connected power bus.

In one embodiment, each power bus connects to two power supplies and one of the two power supplies is connected a first electric source the second of the two power supplies is connected to a second electric source. In another embodiment, the electric power sources comprise alternating current ("AC") electric power sources. In another embodiment, at least two power buses comprise buses within a computer rack system. In another embodiment, the computer rack system is a blade center.

In one embodiment, an apparatus is included to provide reliable electric power. The apparatus includes two power buses that transfer regulated DC power from four power supplies to an electric load. The four power supplies convert AC electric power to a regulated DC electric power. Two of the power supplies receive AC electric power from a first AC electric source and two of the power supplies receive AC electric power from a second AC electric source. The apparatus includes a MOSFET connected between each of the two power buses and the electric load. Each MOSFET connects and disconnects a power bus to the electric load and transfers the regulated DC electric power from the buses to the electric load. The apparatus includes an output power bus connection disposed on each of the four power supplies. Each of the power buses is connected to two power supplies and each output power bus connection connects the corresponding power supply upon which the output power bus connection is disposed to exactly one power bus. The output power bus connections transfer the regulated DC electric power to the connected power bus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
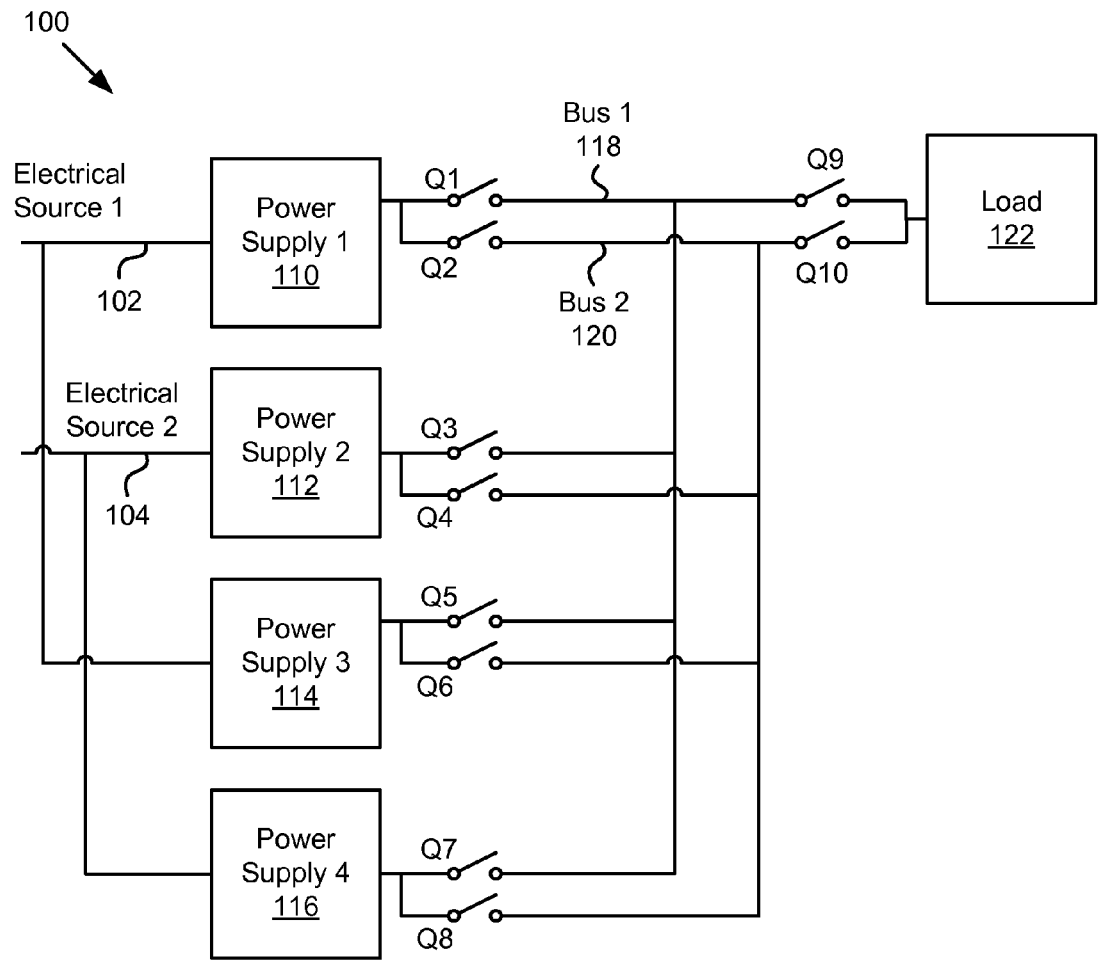
FIG. 1 is a schematic block diagram illustrating a prior art system for supplying power with redundant power supplies.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
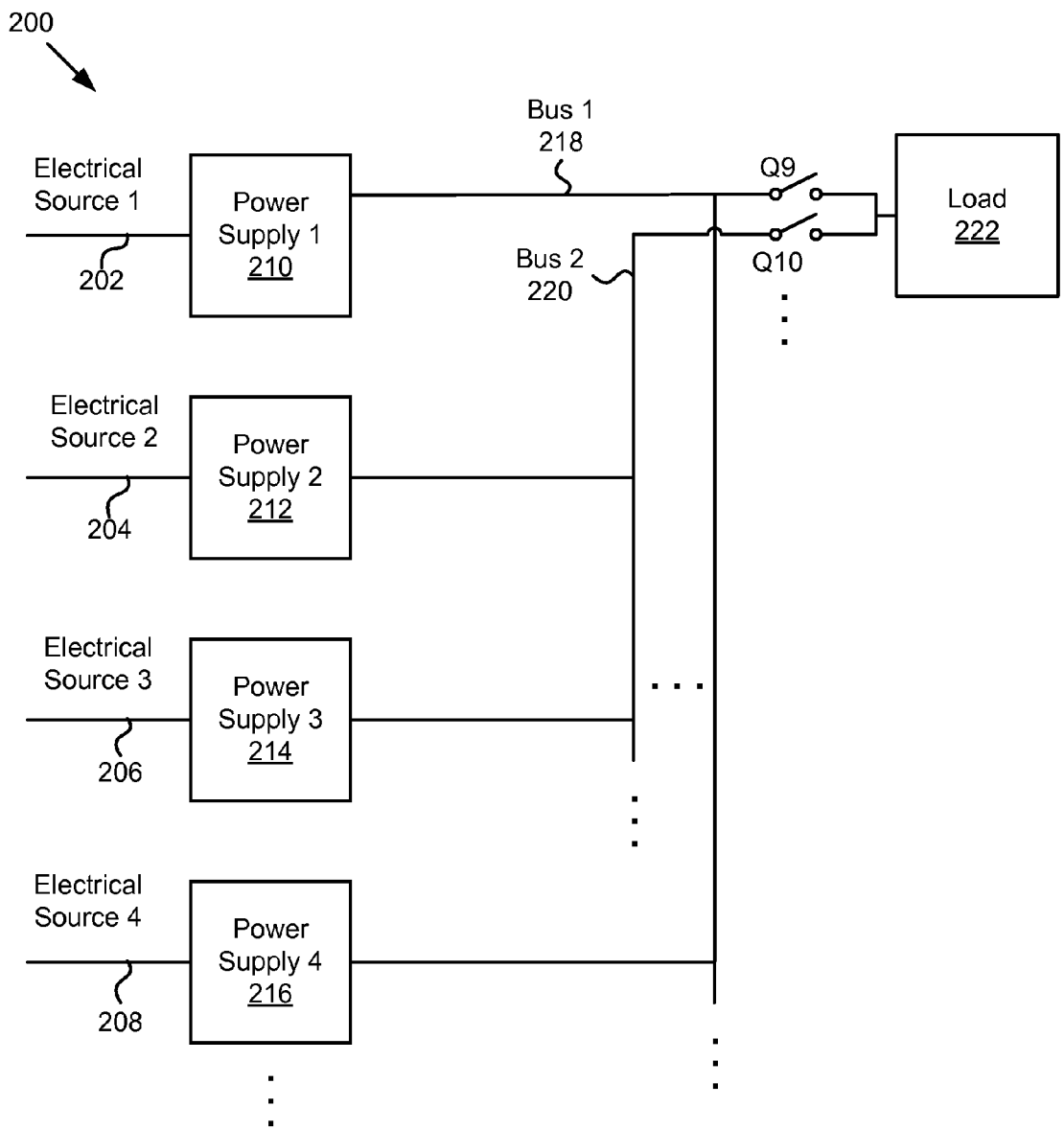
FIG. 2 is a schematic block diagram illustrating one embodiment of a system for providing reliable electric power in accordance with the present invention.

FIG. 2 depicts one embodiment of a system 200 for providing electric power. In one embodiment, the system 200 includes one or more electric sources 202, 204, 206, 208, at least four power supplies 210, 212, 214, 216, at least two power buses 218 and 220, at least two switches Q9 and Q10, and an electric load 122, which are described below.

In one embodiment, the one or more electric sources 202, 204, 206, 208 provide electric power. In one embodiment, the one or more electric sources 202, 204, 206, 208 are alternating current ("AC") electric sources. In various embodiments, the electric sources 202, 204, 206, 208 may be one or more standard AC electric outlets, connection to a building power system, AC electric generators, and/or other types of AC electric sources. In other embodiments, the electric sources 202, 204, 206, 208 may be uninterruptible power supplies ("UPSs"), DC power buses, etc.

The one or more electric sources 202, 204, 206, 208 may comprise a single electric source, or multiple electric sources. The redundancy of multiple electric sources typically provides greater reliability than a single electric source. In one embodiment, where the one or more electric sources 202, 204, 206, 208 are AC sources, the electric sources 202, 204, 206, 208 may provide AC electric power having a frequency of about 50 to 60 hertz ("Hz") and having a voltage between about 100 volts ("V") to about 250 V, or having another standard frequency and voltage.

In one embodiment, the power supplies 210, 212, 214, 216 receive electric power from the one or more electric sources 202, 204, 206, 208. In one embodiment, the power supplies 210, 212, 214, 216 are connected to the one or more electric sources 202, 204, 206, 208 with a standard power cable or the like. The four power supplies 210, 212, 214, 216 convert the AC or direct current ("DC") electric power to a regulated DC electric power. The power supplies 210, 212, 214, 216 may use rectifiers, filters, capacitors, or other electrical components, as will be apparent to those of skill in the art in view of this specification, to convert the AC electric power to regulated DC electric power. In one embodiment, the power supplies 210, 212, 214, 216 convert the electric power to regulated DC electric power having a voltage of about 12 V. In another embodiment, the DC voltage is another standard voltage, such as 1.2 V, 1.5 V, 5 V, 9 V, or the like. In one embodiment, the power supplies 210, 212, 214, 216 each source about 1450 watts ("W") and are used in a computer rack, such as a blade center.

In one embodiment, each of the at least two power buses 218, 220 are electrically coupled to at least two of the power supplies 210, 212, 214, 216. The power buses 218, 220 transfer the regulated DC electric power from the power supplies 210, 212, 214, 216 to the load 222. In one embodiment, about half of the power supplies 210, 216 are coupled to a first power bus 218, and about half of the power supplies 212, 214 are coupled to a second power bus 220. In a preferred embodiment, each of the power supplies 210, 212, 214, 216 is coupled to a single power bus selected from the at least two power buses 218, 220. In the illustrated embodiment, the first power bus 218 is coupled to the first and fourth power supplies 210, 216 in a parallel configuration, and the second power bus 220 is coupled to the second and third power supplies 212, 214 in a parallel configuration. In a further embodiment, each of the power supplies 210, 212, 214, 216 each provide about 1450 W, and each of the power buses 218, 220 provide about 2900 W sourced from two of the power supplies 210, 212, 214, 216.

In one embodiment, the switches Q9, Q10 are each connected to a power bus 218, 220 and to the electric load 222 such that each of the switches Q9, Q10 connects and disconnects one of the two power buses 218, 220 to the electric load 222. The switches Q9, Q10 may be mechanical switches, semiconductor devices such as field-effect transistors ("FETs") or bipolar junction transistors ("BJTs"), or another switch type. In one embodiment, the switches Q9, Q10 are metal-oxide-semiconductor FETs ("MOSFETs"). In another embodiment, the switches Q9, Q10 disconnect the first power bus 218 and/or the second power bus 220 in response to a power bus fault, such as a short at an output of one of the power supplies 210, 212, 214, 216, or another type of power bus fault.

In one embodiment, the electric load 126 receives the regulated DC electric power from the power buses 218, 220 through the switches Q9, Q10. The electric load 222 may include the at least two switches Q9, Q10, the switches Q9, Q10 may be integrated with the power buses 218, 220, or the switches Q9, Q10 may be individual components connected between the power buses 218, 220 and the electric load 222. In one embodiment, the electric load 222 is an electric device or part of an electric device. The electric load 222 may be from a computer such as a desktop computer, a rack-mount server, a server blade, or the like. In a further embodiment, the electric load 222 may be multiple electric devices, such as multiple server blades or the like.

In one embodiment, the power buses 218, 220 provide about twice as much electric power as the electric load 222 uses when there is not a power supply fault, a power bus fault, or the like. Fifty percent utilization allows for continued operation during many fault situations. For example, if one or two of the at least four power supplies 210, 212, 214, 216 fails, if one of the at least two power buses 118 and 120 fails, or if up to half of the one or more electric sources 202, 204, 206, 208 fail, the load 222 will still have enough electric power.

Advantageously, the system 200 depicted in FIG. 2 provides redundancy and flexibility required for a highly available system but also is less costly and is only slightly less flexible than the system 100 depicted in FIG. 1. If any one power supply (e.g. power supply 1 210) fails so its output is shorted, the switch (Q9) connected to the first bus 218 can open and two power supplies (e.g. power supplies 2 and 3 212, 214) are still available. The same is true if a bus (e.g. bus 1) fails in a shorted condition. If one power supply (e.g. power supply 1 210) fails (other than an output short), three power supplies (e.g. power supplies 2, 3, 4 212, 214, 216) remain available. The system 200 depicted in FIG. 2 is also more efficient than the traditional system 100 depicted in FIG. 1 because parasitic power loss of the switches in the power supplies 210, 212, 214, 216 is avoided.

Figure 3:
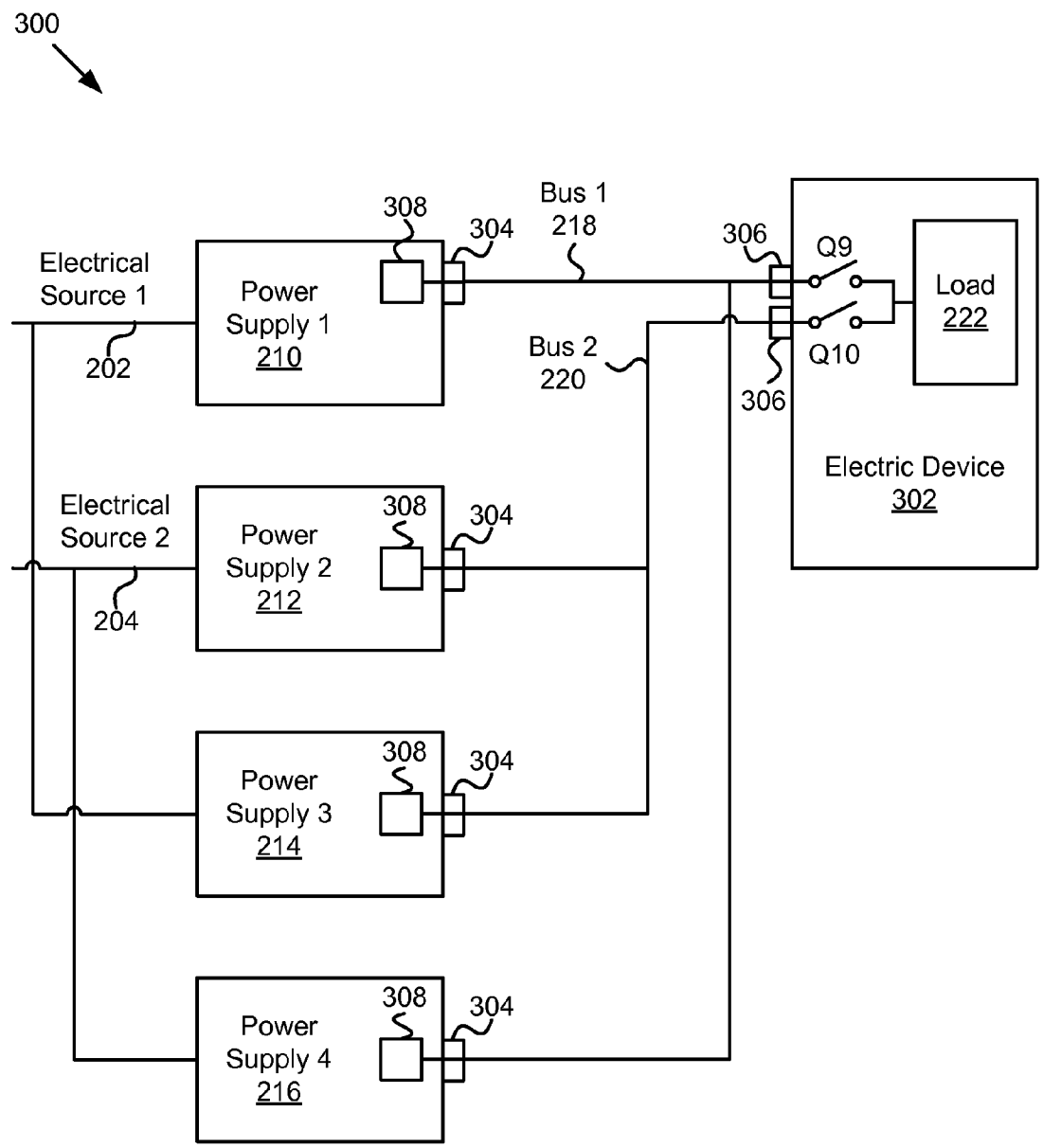
FIG. 3 is a schematic block diagram illustrating another embodiment of a system for providing reliable electric power in accordance with the present invention.

FIG. 3 illustrates a specific embodiment of a system 300 for providing electric power. The system 300 may be substantially similar to the system 200 of FIG. 2. In one embodiment, the system 300 comprises two electric sources 202, 204, four power supplies 210, 212, 214, 216 two power buses 218, 220, and a load 222, which are substantially similar to those described in relation to the system 200 depicted in FIG. 1. In one embodiment, the electric load 222 is the load provided by an electric device 302. The system 300 also includes a single output power bus connection 304 is disposed on each of the power supplies 210, 212, 214, 216 connected to the buses 218, 220 and two output power bus connections 306 connected to the switches Q9, Q10 of the load 222. Each power supply 210, 212, 214, 216 also includes an isolation module 308. The components of the system 300 are described below.

In one embodiment, the first AC electric source 202 provides AC electric power to a first group of two power supplies 210, 214 and the second AC electric source 204 provides AC electric power to a second group of power supplies 212, 216. Providing AC electric power from two power supplies instead of one provides a layer of redundancy and robustness against failure of the system 300.

In one embodiment, each of the four power supplies 210, 212, 214, 216 include an output power bus connection 304. The output power bus connections 304 are each configured to transfer regulated DC electric power from one of the power supplies 210, 212, 214, 304 to one of the power buses 218, 220. In a further embodiment, a single output power bus connection 304 is disposed on each of the power supplies 210, 212, 214, 216. The output power bus connections 304 may include plugs, outlets, receivers, fasteners or the like that engage corresponding plugs, outlets, receivers, fasteners of the like disposed on an end of the two power buses 218, 220 or any other means to connect the power buses 218, 220 to the power supplies 210, 212, 214, 216. The output power bus connections 304 may be removably connected to the two power buses 218, 220 or fixedly connected to the two power buses 218, 220. The output power connections 304 are included in some form in the system 200 of FIG. 2 but are not shown.

In one embodiment, input power bus connections 306 connect the power buses 218, 220 to the two switches Q9, Q10 connected to the electric load 222. In one embodiment, the switches Q9, Q10 and load are part of the electric device 302 and the input connectors 306 are on the electric device 302 with internal connections to the switches Q9, Q10. In one embodiment, each of the two input power bus connections 306 transfer regulated DC electric power from one of the two power buses 218, 220 to the electric device 302 and the electric load 222. The input power bus connections 306 may include plugs, outlets, receivers, fasteners or the like that engage corresponding plugs, outlets, receivers, fasteners of the like disposed on an end of the two power buses 218, 220, the switches Q9 Q10, or the electric device 302. In one embodiment, the two input power bus connections 306 may be substantially similar to the output power bus connections 304 and may include any means of connecting the power buses 218, 220 to the switches Q9, Q10 or electric device 302. The input power bus connections 306 may be removably connected to the two power buses 218, 220 or fixedly connected to the two power buses 218, 220.

The electric device 302 may be a device that benefits from redundant power supplies and/or power supply fault recovery. The electric device 302 may be a computer device such as a desktop computer, a rack-mount server, a server blade, or the like. In one embodiment, the electric device 302 comprises two or more electric devices 302, each with two switches Q9, Q10, a load 222, and connected to the power buses 218, 220. In another embodiment, the electric devices are servers, routers, storage devices, etc. within a blade center or other computer rack system and the power buses 218, 220 are in the computer rack or blade center.

In one embodiment, the two switches Q9, Q10 are substantially similar to the two switches Q9, Q10 of FIG. 1. The two switches Q9, Q10 are disposed between the two power buses 218, 220 and the electric load 222 such that each of the two switches Q9, Q10 connects and disconnects one of the two power buses 218, 220 to the electric load. The two switches Q9, Q10 may isolate one or two of the two power buses 218 from the electric load 222 in response to a power bus fault, such that an electric short in one of the two power buses 218, 220 will not short the other of the two power buses 218, 220.

In one embodiment, each of the four power supplies 210, 212, 214, 216 includes an isolation module 308. The isolation modules 308 are each configured to isolate one of the four power supplies 210, 212, 214, 216 from one of the two power buses 218, 220 in response to a power supply fault. A power supply fault is typically an electric short, a faulty component or connection, or another electric or mechanical power supply fault. The isolation modules 308 may each comprise a diode, a mechanical switch, a semiconductor switch such as a MOSFET or a BJT, a fuse, a fusible link, a circuit breaker, or another isolations means.

The electric load 222 may comprise the electrical components and circuitry of the electric device 302. The electric load 222 receives regulated DC electric power from the two power buses 218, 220 through the two switches Q9, Q10 when the switches Q9, Q10 connect either or both of the two power buses 218, 220 to the electric load 222. As described above, in one embodiment, the at least two power buses 218, 220 provide about twice as much electric power as the electric load 222 uses when there is not a power supply fault, a power bus fault, or the like. For example, in one embodiment, each of the four power supplies 210, 212, 214, 216 provides about 1450 W of power, and the electric load 222 uses about 2900 W. When the system 200 is not operating under a fault condition, about 5800 W are available to the electric load 222 giving the system 200 fifty percent power utilization. If either of the two AC power sources 202 and 204 fails, or either of the two power buses 218, 220 fails, about 2900 W will still be available to the electric load 222. Alternatively, one or two of the four power supplies 210, 212, 214, 216 may fail and the system 200 will still provide either about 4350 W or about 2900 W to the electric load 222.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
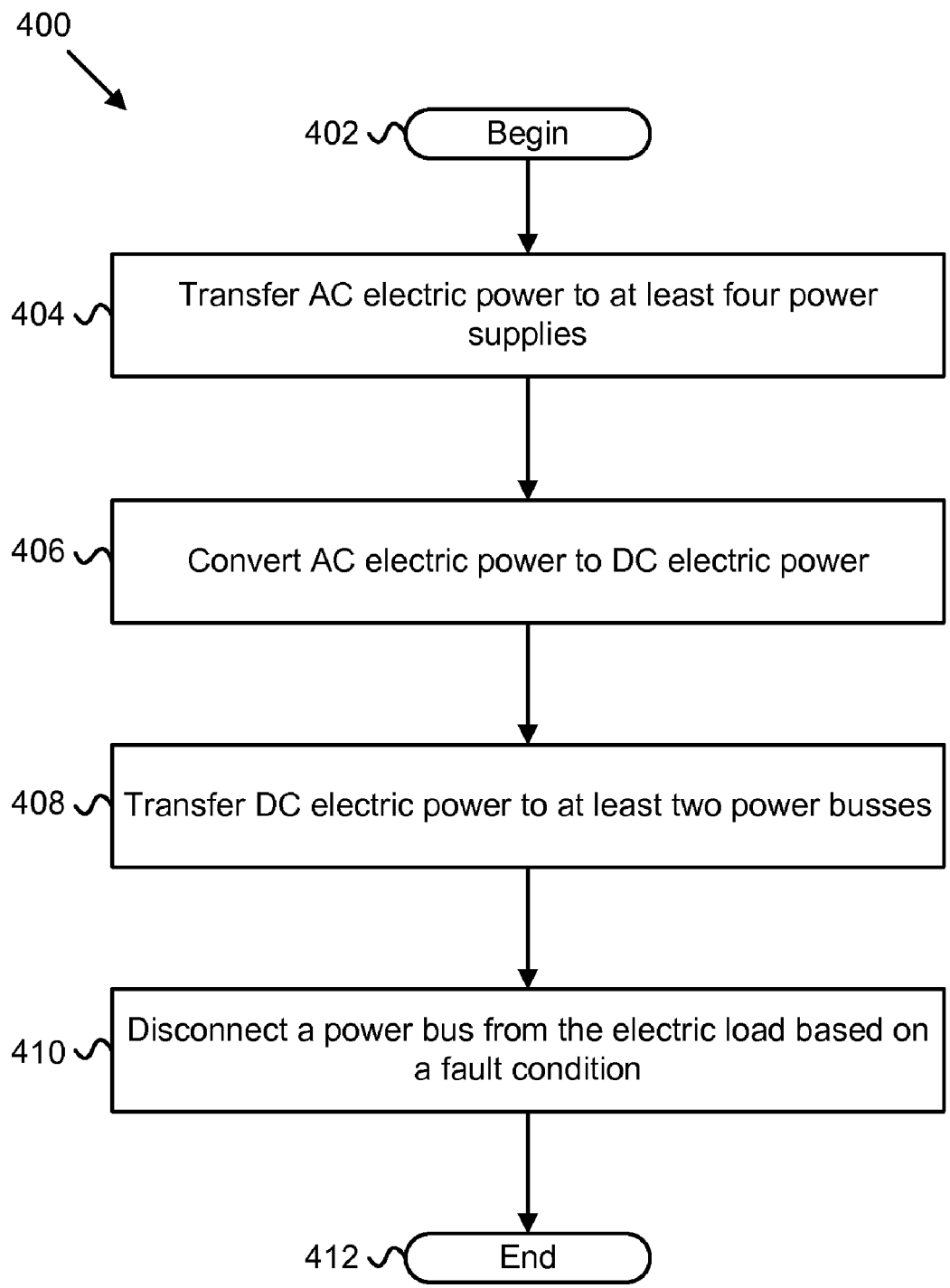
FIG. 4 is a schematic flow chart diagram illustrating one embodiment of a method for providing electric power in accordance with the present invention.

FIG. 4 is a schematic flow chart diagram illustrating one embodiment of a method 400 for providing electric power. The method 400 begins 402, and the electric sources 202, 204, 206, and 208 transfer 404 electric power to the at least four power supplies 210, 212, 214, 216. The at least four power supplies 210, 212, 214, 216 convert 406 the electric power to regulated DC electric power. The power supplies 210, 212, 214, 216 transfer 408 the regulated DC electric power to the at least two power buses 218, 220. The at least two switches Q9, Q10 selectively disconnect 410 a power bus 218, 220 from the electric load 222 based on a fault condition and the method 400 ends 412.

Figure 5:
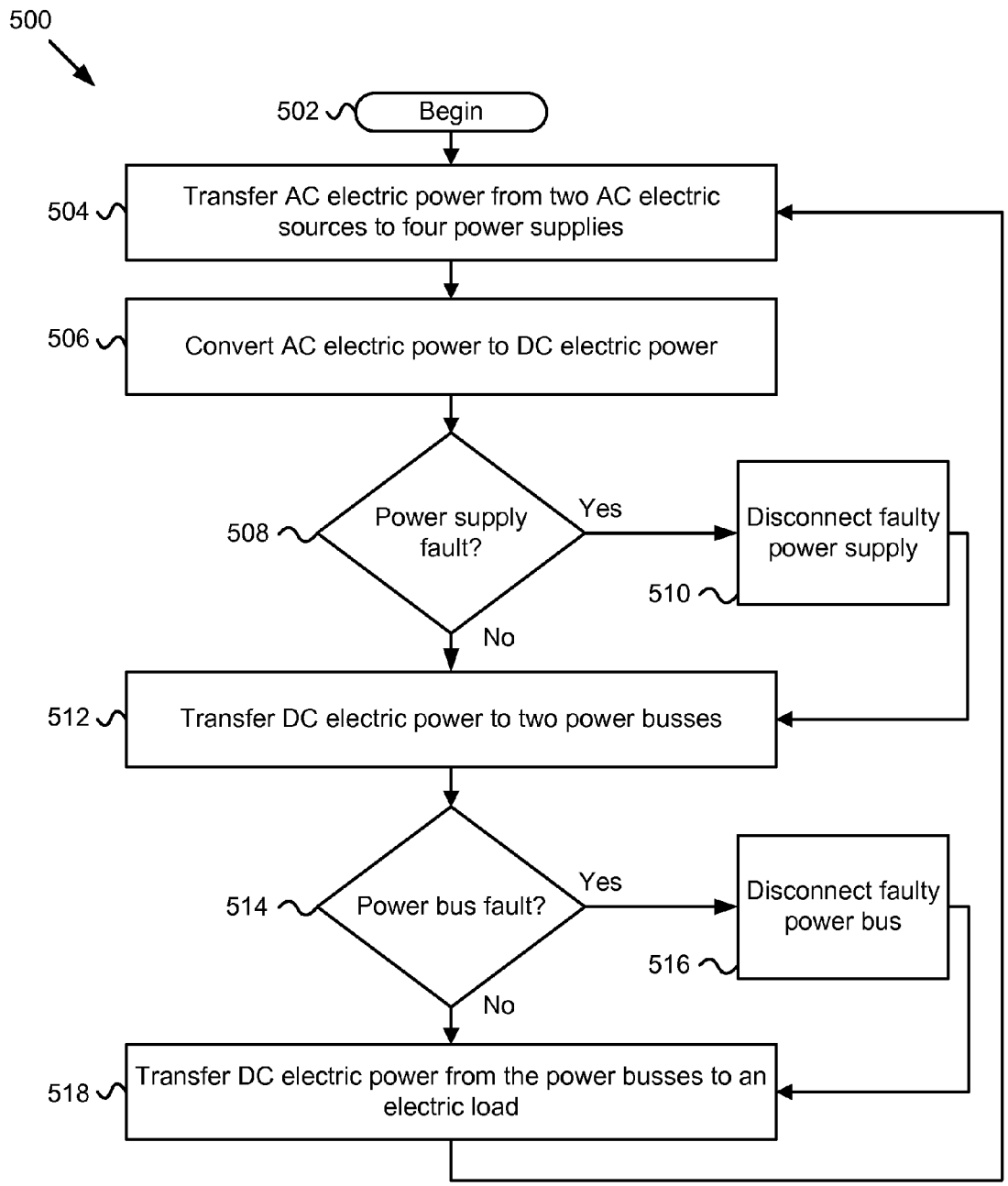
FIG. 5 is a schematic flow chart diagram illustrating another embodiment of a method for providing reliable electric power in accordance with the present invention.

FIG. 5 is a schematic flow chart diagram illustrating one embodiment of a method 500 for providing electric power for the system 300 in FIG. 3. The method 500 begins 502, and the electric sources 202, 204 transfer 504 electric power to the power supplies 210, 212, 214, 216. The power supplies 210, 212, 214, 216 convert 506 the electric power to a regulated DC electric power. The isolation modules 308 determine 508 whether one or more of the four power supplies 210, 212, 214, 216 have a power supply fault. If the isolation modules 308 find 508 a power supply fault, the isolation module 308 in the power supply with the fault (e.g. 210) disconnects 510 the power supply 210 from the power bus 218 connected to the power supply 210. The output power bus connectors 304 transfer 512 the regulated DC electric power to the at least two power buses 218, 220 from the remaining power supplies 212, 214, 216 that do not have power supply faults.

Circuitry controlling the switches Q9, Q10 determines 514 if there is a power bus fault in a power bus (e.g. 218). If the circuitry determines 514 that there is a power bus fault, the switch Q9 connected to the faulted bus 218 disconnects 516 the faulted power bus 218 by opening the appropriate switch Q9. The remaining switch Q10 transfers 518 regulated DC electric power from the power bus 220 that is not faulted to the electric load 222. The method 500 may continue and recluse a switch Q9 if a fault is cleared or an isolation module 308 may reconnect a power supply 210 if the power supply 210 clears a fault, is replaced, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide reliable electric power, the apparatus comprising:
at least two power buses that transfer regulated direct current ("DC") power from at least four power supplies to an electric load, the at least four power supplies receiving electric power from a plurality of electric sources and each of the at least four power supplies converting the electric power to the regulated DC electric power;
a switch connected between each of the at least two power buses and the electric load, wherein each switch connects and disconnects a power bus to the electric load and transfers the regulated DC electric power from the buses to the electric load; and
an output power bus connection disposed on each of the at least four power supplies, wherein each of the power buses is connected to at least two power supplies connecting the at least two power supplies in parallel, the at least two power supplies of a power bus receive electric power from different electric sources of the plurality of electric sources, and each output power bus connection connects the corresponding power supply upon which the output power bus connection is disposed to exactly one power bus, the output power bus connections transferring the regulated DC electric power to the connected power bus.

2. The apparatus of claim 1, wherein the power supplies receive electric power from two electric sources and each of the at least two power buses is connected to at least one power supply from each of the two electric sources.

3. The apparatus of claim 2, wherein about half of the at least four power supplies receive electric power from a first electric source and the remainder of the at least four power supplies receive electric power from a second electric source.

4. The apparatus of claim 1, wherein the power buses comprise two power buses, each of the two power buses electrically coupled to exactly two output power bus connections.

5. The apparatus of claim 1, wherein the at least two switches are each configured to disconnect a power bus from the electric load in response to a power bus fault.

6. The apparatus of claim 5, wherein the at least two switches comprise mechanical switches.

7. The apparatus of claim 5, wherein the at least two switches comprise semiconductor devices.

8. The apparatus of claim 7, wherein the at least two switches comprise field-effect transistors ("FETs").

9. The apparatus of claim 8, wherein the at least two switches comprise metal-oxide-semiconductor field-effect transistors ("MOSFETs").

10. The apparatus of claim 7, wherein the at least two switches comprise bipolar junction transistors ("BJTs").

11. The apparatus of claim 1, wherein the electric load comprises the at least two switches.

12. The apparatus of claim 1, wherein the regulated DC electric power has a voltage of about 12 volts.

13. The apparatus of claim 1, wherein each of the power supplies comprises an isolation module, each of the isolation modules configured to isolate a power supply from a power bus in response to a power supply fault.

14. A system to provide reliable electric power, the system comprising:
at least four power supplies receiving electric power from a plurality of electric sources and each of the at least four power supplies converting the electric power to a regulated direct current ("DC") electric power;

one or more electric devices comprising an electric load;

at least two power buses that transfer the regulated DC power from the at least four power supplies to the load of the one or more electric devices, a switch connected between each of the at least two power buses and the electric load, wherein each switch connects and disconnects a power bus to the electric load and transfers the regulated DC electric power from the buses to the electric load; and an output power bus connection disposed on each of the at least four power supplies, wherein each of the power buses is connected to at least two power supplies connecting the at least two power supplies in parallel, the at least two power supplies of a power bus receive electric power from different electric sources of the plurality of electric sources, and each output power bus connection connects the corresponding power supply upon which the output power bus connection is disposed to exactly one power bus, the output power bus connections transferring the regulated DC electric power to the connected power bus.

15. The system of claim 14, wherein each of the at least two switches is configured to disconnect a power bus from the electric load in response to a power bus fault.

16. The system of claim 14, wherein each power bus connects to two power supplies, and wherein one of the two power supplies is connected a first electric source the second of the two power supplies is connected to a second electric source.

17. The system of claim 14, wherein the electric power sources comprise alternating current ("AC") electric power sources.

18. The system of claim 14, wherein the at least two power buses comprise buses within a computer rack system.

19. The system of claim 18, wherein the computer rack system comprises a blade center.

20. An apparatus to provide reliable electric power, the apparatus comprising:

two power buses that transfer regulated direct current ("DC") power from four power supplies to an electric load, each of the four power supplies converting alternating current ("AC") electric power to a regulated DC electric power, two of the power supplies receiving AC electric power from a first AC electric source and two of the power supplies receiving AC electric power from a second AC electric source;

a metal-oxide-semiconductor field-effect transistor ("MOSFET") connected between each of the two power buses and the electric load, wherein each MOSFET connects and disconnects a power bus to the electric load and transfers the regulated DC electric power from the buses to the electric load; and an output power bus connection disposed on each of the four power supplies, wherein each of the power buses is connected to two power supplies connecting the two power supplies in parallel, a first power supply of the two power supplies of each power bus connection receives electric power from the first AC electric source, a second power supply of the two power supplies of each power bus connection receives electric power from the second AC electric source, and each output power bus connection connects the corresponding power supply upon which the output power bus connection is disposed to exactly one power bus, the output power bus connections transferring the regulated DC electric power to the connected power bus.

\* \* \* \* \*